(No Model.)
E. THOMSON.
ELECTRIC METAL WORKING AND WELDING MACHINE.
No. 398,914. Patented Mar. 5, 1889.
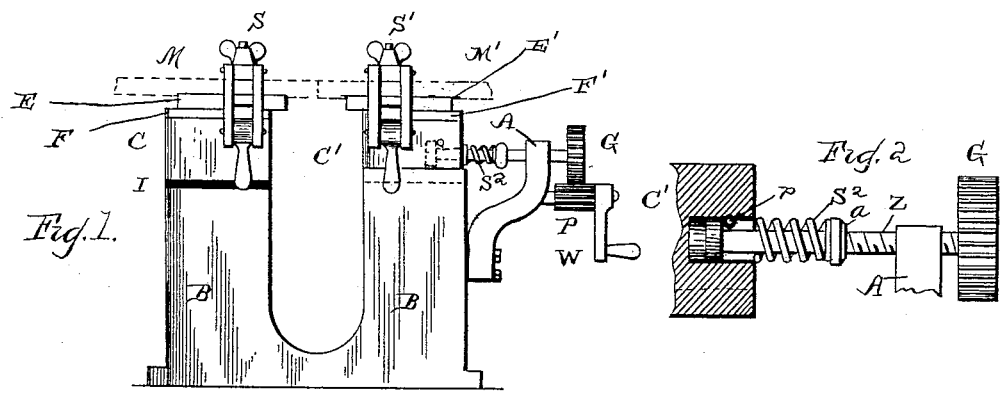
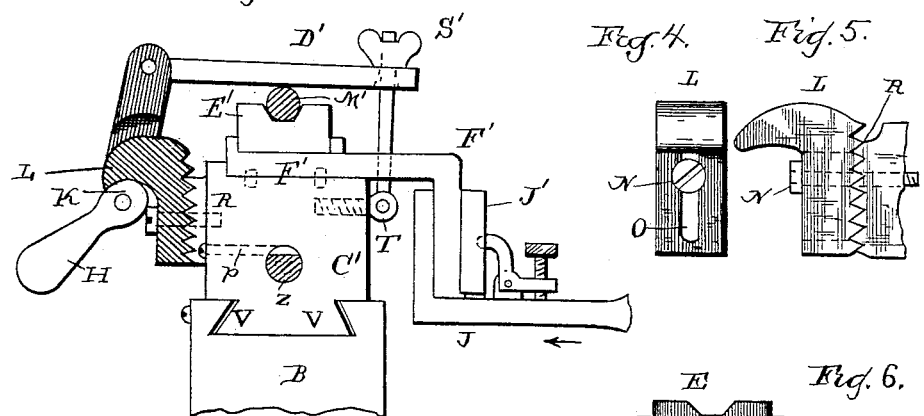
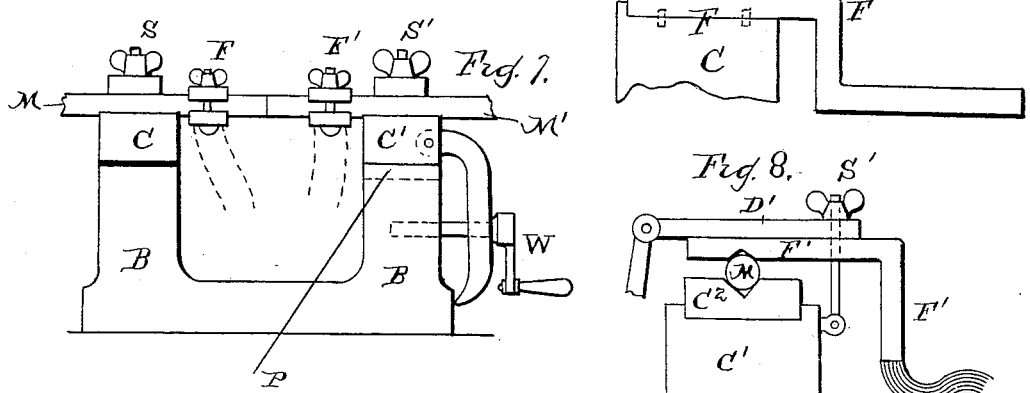
WITNESSES:
Ira R. Steward
Wm. H. Capel
INVENTOR,
Elihu Thomson,
BY
H. C. Townsend
ATTORNEY.

UNITED STATES PATENT OFFICE.

ELIHU THOMSON, OF LYNN, MASSACHUSETTS.

ELECTRIC METAL WORKING AND WELDING MACHINE.

SPECIFICATION forming part of Letters Patent No. 398,914, dated March 5, 1889.

Application filed October 8, 1888. Serial No. 287,562. (No model.)

*To all whom it may concern:*

Be it known that I, ELIHU THOMSON, a citizen of the United States, and a resident of Lynn, in the county of Essex and State of Massachusetts, have invented certain new and useful Electric Metal Working and Welding Machinery, of which the following is a specification.

My invention relates to apparatus designed for use in those welding, forging, or other metal-working operations in which the object or work is heated by the agency of a heavy electric current or current of large volume, as in the welding operation forming the subject of my prior patent, No. 347,140, and in which the clamps or holders for the work, one or both, require to be movable in order to permit the requisite mechanical operation of pressure or otherwise-applied force used in the welding, upsetting, bending, or other process to be performed without disturbing the work in its clamps or holders.

My invention consists in separating as far as may be in the apparatus the functions of applying the current and performing the mechanical operation by making those parts which are immediately concerned in holding the work in the mechanical operations, and which require to remain true and not easily put out of true, of rigid materials—such as cast-iron or steel, which are of low conducting power for electric current—while other parts or pieces have the function assigned to them of conducting the current to the work and are made of good conducting metal, as copper or its alloys, which are not very rigid and are apt to bend or get out of shape. By this expedient I secure increased economy and durability of construction and reliability of operation over former apparatus of this character, wherein the supporting and holding parts for the work perform the function of conducting the current to the work, and, being of copper or similar good conductor, require to be massive, cumbersome, and expensive in order to secure the desired stability and exactness under all conditions of use.

My invention consists, further, in certain details of construction of the apparatus, to be hereinafter more particularly described.

In the accompanying drawings, Figure 1 is a side elevation of an apparatus embodying my invention. Fig. 2 is a detail side view of the device for imparting movement to a clamp or holder. Fig. 3 is an end view of one of the clamps or holders. Fig. 4 is a face view of a detail device used in giving adjustability to the clamp for different sizes of work. Fig. 5 is a side view of the same. Fig. 6 shows in detail another portion of the clamp. Fig. 7 shows in side elevation another form of apparatus embodying my invention. Fig. 8 shows a further modification of the invention.

Referring to Fig. 1, B B indicate a rigid base sustaining the clamps or bodies to which the clamping devices are attached. These clamp bodies or bases are indicated by the letters C C'. The base B B may be made of cast-iron or steel, as may also be the clamp bodies or pieces C C', surmounting the same. The piece C is a block insulated from the base B B at I by a thin layer of paper or other insulation, which still permits the block to be secured firmly in place and true. The clamp body or piece C', not necessarily insulated, is movable in rigid true guides to and from the other clamp or holder. It is moved by suitable mechanism, which may be variously arranged, but is shown as consisting of a screw and spring with a gear, G, rotatable by a pinion, P, turned by a winch, W, as appears more fully in Fig. 2. The gear G on one end of the feed-screw Z turns the screw through a fixed nut or threaded hole in arm A, and thereby compresses or relaxes the spring $S^2$ between a collar on the screw-shaft and the block or piece C', a hole in which latter receives the end of the screw-shaft. This end of the shaft has also a flange within the hole in C'. The end of the shaft is prevented from being withdrawn by means of a pin, $p$, with which the flange engages. The spring $S^2$ is not essential, except when elastic pressure may be needed, and may be therefore sometimes dispensed with and the collar $a$ made to bear directly on the piece C'. Rotation of the screw Z will either pull or push the piece C', as is evident.

Resting truly upon the clamp-bodies C C' are plates F F', of copper or copper alloy, or other good conducting metal, which may be as hard as is consistent with good conduction of current. Through these plates F F' current is supplied to the work, as will presently appear. These plates may, if found convenient, be surmounted by receiving dies or forms E E', to hold and fit the pieces to be welded or worked by electric currents. Over all come clamping devices or attachments—such, for instance, as shown more in detail in Fig. 3—for holding the pieces to be worked, M M', firmly upon the clamp bodies or pieces C C'.

In Fig. 3 the preferred construction of clamps and blocks carried by piece C' is shown, the fixed support or piece C being similarly provided. The base-plate B, Fig. 3, has a dovetail slide planed in it to receive the dovetail V V at the bottom of piece C'. These parts are accurately and smoothly fitted, but might be replaced by any other true sliding and accurate joint, permitting movement in the desired direction, straight or curved, to be given to the piece C', holding and supporting the work. Above piece C' is the conducting-plate F' F', fitted closely and either directly supporting the piece to be worked, M', or, better, an intermediate plate of good conducting metal, E', is interposed. This latter may easily be replaced by other and differently-formed pieces, and may be easily trued where out of shape or bent.

Firmly attached at T on the clamp body or base, or pivoted thereat, is a bolt, whose upper end passes through a hole in a clamping-strap, D', and receives a thumb-nut or other nut, S', to adjust the bearing of the strap with relation to the screw. Linked to the other end of the strap D' is a cam and operating-handle, K H, engaging under a lug, L, carried by the clamp body or piece C. This lug L may be made adjustable, as shown at R.

In Fig. 4 a face or front view of lug or hook L is shown with a slot and screw, N, for securing it in various positions of vertical adjustment. The rack or serrated interlocking parts of the lug and of the piece C' are shown at R, Fig. 5. This device permits the lug L to be set and firmly attached at any desired elevation to suit different sizes and forms of pieces M' to be held, while the nut S' makes the finer adjustments.

At J J' is shown a sliding or slip joint or connection of heavy copper pieces for conveying current to plate F' F' from any suitable source. Heavy flexible cables might replace the slip-joint between J and J', as indicated in Fig. 8. This is only needed in the case of the movable clamp body or holder C'. The plate F, Figs. 1 and 6, carried by piece C, may be solidly and rigidly attached, if desired, to the conductor supplying the currents, of which conductor it may, in fact, be a continuance, as indicated in Fig. 6. The plate E, removable and replaceable, is like plate or receiver E', Fig. 3.

I have shown in the preceding figures one of the special ways in which the mechanically-rigid parts supporting the work may be independent of the parts which have the function of conducting the current to the work, and the current-conducting parts may be independent of the mechanically-moving rigid element, thus permitting the parts requiring to be rigid to be made of suitably-stiff but not good conducting material, requiring for the proper construction of the whole apparatus a comparatively limited amount of copper conductor and securing cheapness of construction, whereas if the mechanical rigidity had to be secured by materials which are also good conductors they, being soft, would require to be very massive, thus making the apparatus far more costly than apparatus constructed in accordance with my present invention.

In Fig. 7 I have shown a modification in the manner of carrying current to the work independently of the rigid or stiff supporting bodies or pieces for the work. Here the base B B and iron or steel pieces C C', or rigid structure carrying the clamps and moving the pieces M M' truly and accurately, are separate from the current-carrying clamps F F', which are of pure copper or highly-conducting metal for electric currents attached to suitable sources of heavy currents. The clamps F F' may be put on the pieces M M', inside the clamps S C and S' C', or just outside, if desired, and close to the same. The passage of current will only heat that portion where the section of conductor is constricted—i. e., between the inner clamps.

Again, as in Fig. 8, the piece C', of rigid metal and poorly conducting, may be used to hold the piece M directly, or, as shown, be surmounted by a hard-metal plate, $C^2$, of steel, and accurately placed and formed, giving a true bearing for the piece M, which cannot therefore be out of line, and the soft-metal conducting-piece F F', of copper, may be clamped down on the piece by the strap D'. The piece F' F' must in this case be flexible to some extent or be free to adjust itself to the piece M. Here, as before, is a virtual independence of current conduction and mechanical placing and holding such, that massive supports of cheap and rigid metal may be used, which is not called upon to convey current to the pieces, and which current is independently conveyed by excellent conductors without regard to their being rigid.

What I claim as my invention is—

1. In an electric metal-working apparatus, rigid supports upon which the clamps or holders for the work are directly supported, in combination with independent conducting-pieces for supplying current to the work through a path independent of the rigid supports, as and for the purpose described.

2. In an electric metal-working apparatus, a supporting and guiding base carrying clamping devices by which the work is held, made of steel, iron, or such like rigid but comparatively poor conducting material, in combination with electric conductors of copper or other good conducting material in connection with the work and supplied with current through a path independent of the supporting and guiding base.

3. In an electric metal-working apparatus, mechanical holding and moving devices for the work, in combination with current-supplying devices electrically independent thereof, as and for the purpose described.

4. In an electric metal-working apparatus, the combination, with mechanical holding devices for the work, of plates or pieces of good conducting material interposed between the same and the metal to be operated upon and electrically connected with the source of heating-current by a direct conductor independently of the material of the holding devices.

5. In an electric metal-working apparatus, clamping or holding devices for the work, made of steel, iron, or such like material that is a comparatively poor conductor, in combination with electric conducting-pieces of good conducting material applied to the work near the part to be heated and connected with the source through a conductor independent of the body or material of the holding devices.

6. The combination, with the movable clamp body or support sliding in a suitable guide, of a current conveying sliding connection independent of said guide.

7. In an electric welding or metal-working apparatus, the combination, with the movable clamp or holder carrying the work, through which an electric current passes, of an operating-screw and interposed spring for giving a forward movement to the clamp, and a connection between the screw and clamp for moving the latter in the opposite direction when the screw is reversed and the spring relieved.

8. In an electric welding or metal-working apparatus, the combination, with the movable clamp carrying the metal, heated by an electric current, of the operating-screw provided with a flange, a pin in the clamp for engaging with the flange, and a spring compressed between the clamp and screw, as and for the purpose described.

9. The combination, with an electric welding or metal-working apparatus, of the clamp bar or plate D', a link at one side pivoted to the clamp-body, and a locking-cam hung from a link connected with the opposite side.

10. The combination, with an electric metal-working apparatus, of a clamp bar or plate, D', a rod pivoted to the clamp-body and provided at its upper end with an adjustable nut, and a locking-cam hung from a link connected to said bar at the side of and opposite said rod.

11. The combination, with an electric metal-working apparatus, of the clamp bar or plate D', a pivoted locking-cam supported thereby, and an adjustable lug with which the locking-cam engages, said lug being supported by the clamp-body.

12. The combination, with an electric metal-working apparatus, of the clamping devices, the locking-cam, and an adjustable lug for engagement by said cam, said lug being provided with serrations, as described, and a fastening-screw for holding it in position against the clamp-body.

Signed at Lynn, in the county of Essex and State of Massachusetts, this 26th day of September, A. D. 1888.

ELIHU THOMSON.

Witnesses:
J. W. GIBBONEY,
GEO. E. EMMONS.